Dec. 4, 1923.

J. L. SHROYER 1,476,376

ELECTRIC HEATER

Filed Feb. 28, 1922

Inventor:
Jacob L. Shroyer,
by *Albert G. Davis*
His Attorney.

Patented Dec. 4, 1923.

1,476,376

UNITED STATES PATENT OFFICE.

JACOB L. SHROYER, OF CHICAGO, ILLINOIS, ASSIGNOR TO EDISON ELECTRIC APPLIANCE COMPANY, INCORPORATED, A CORPORATION OF NEW YORK.

ELECTRIC HEATER.

Application filed February 28, 1922. Serial No. 540,046.

*To all whom it may concern:*

Be it known that I, JACOB L. SHROYER, a citizen of the United States, residing at Chicago, county of Cook, State of Illinois, have invented certain new and useful Improvements in Electric Heaters, of which the following is a specification.

My invention relates to electric heaters and has for its object the provision of a simple, reliable and efficient means for heating by electricity.

More specifically my invention relates to cooking apparatus, such as waffle irons, although obviously it may be used in the heating of various apparatus.

In the heating of cooking plates, such as found in waffle irons, by electric current, a great deal of difficulty has been experienced in maintaining a uniform distribution of heat over the cooking surfaces of the plates so as to cook the waffle uniformly throughout to the proper crispness. This is due to the fact that the edges of the plates cool from contact with the air more rapidly than the centers and, consequently, heat must be supplied to the various parts of the plates at a rate gradually decreasing from the edge to the center in order to heat the cooking surfaces uniformly.

In carrying out my invention in one form as applied to a waffle iron, I mount the heating element adjacent the edge of the cooking plate near the point of greatest heat loss, and gradually decrease the thickness of the plate toward the center so that heat is conducted uniformly to the various portions of the cooking surface. In one embodiment of my invention I mount the heating element in a tapered groove in which the heating element is wedged in good thermal relation with the sides of the groove but spaced from the bottom to prevent overheating at this point. My invention also comprehends a special pivoted electrical connection for the pivoted plate of the waffle iron whereby this member may be swung about its pivot without danger of breaking the connecting leads, and a guard for the terminals of the pivoted plate for protecting them from dirt, grease, etc.

Figure 1:
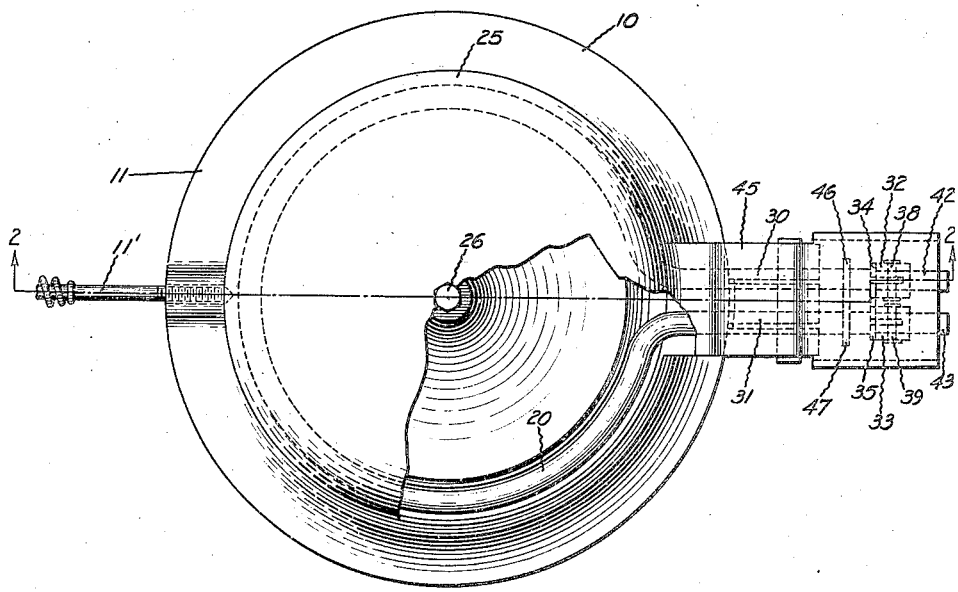
Figure 2:
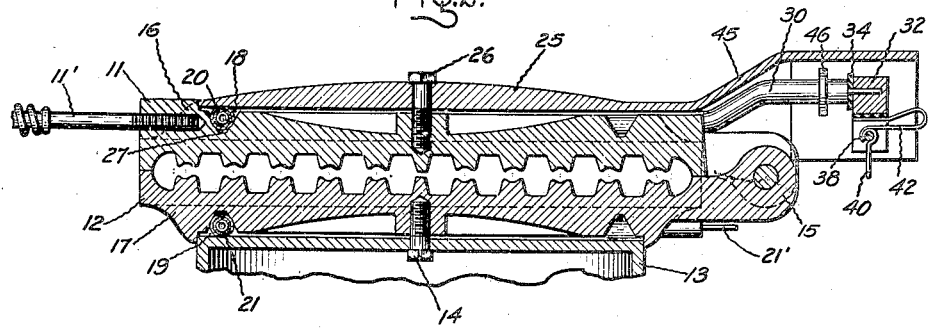
Figure 3:
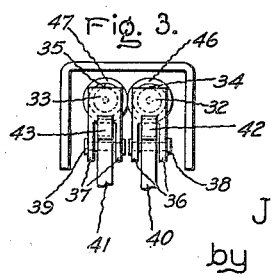

For a better understanding of my invention, reference should be had to the accompanying drawing in which Fig. 1 is a plan view partly in section of a waffle iron embodying my invention; Fig. 2 is a section view along the line 2—2 of Fig. 1 looking in the direction of the arrows; while Fig. 3 is an elevation view showing the electrical connections for the pivoted plate.

Referring to the drawing, the waffle iron 10 comprises the usual two cooperating plates, an upper plate 11 and a lower plate 12. The lower plate is secured to a suitable support 13 by means of a screw 14, while the upper plate is pivotally connected to the lower plate by means of a hinge 15 and normally rests on the lower plate, as shown in Fig. 2. The cooperating surfaces of the plates, forming cooking surfaces for the waffle, are constructed in accordance with any suitable design to mold the waffle as it is cooked into an ornamental form. A handle 11' is provided for plate 11 by means of which the plate may be raised on hinge 15 for the insertion and removal of the cooking material.

In one form of my invention the outer surfaces of the plates 11 and 12 are made concave in form so as to provide annular thickened portions 16 and 17 adjacent the edges of the plates. The edges of the plates are also beveled slightly. The thickened portions 16 and 17 are provided with tapered grooves 18 and 19 in which are mounted suitable heating elements 20 and 21. These heating elements are shown as "sheath wire" heating elements of the type consisting of a resistance conductor embedded in a compacted mass of insulating material enclosed by a metallic sheath as disclosed, for example, in U. S. Patent No. 1,367,341 to Abbott, dated February 1, 1921. Heating element 20 is wedged securely in place in groove 18 by a metallic clamping plate 25 resting on the heating element and secured to the back of plate 11 by a screw 26, while heating element 21 is held wedged in groove 19 in a similar manner by support 13. It will be observed that when each heating element is forced into its groove, its lower portion which is nearest the cooking surface, is spaced slightly, as indicated at 27 (Fig. 2) from the bottom of the groove. The air gap thus formed, acting as a heat insulator, interrupts the transmission of heat and prevents the too rapid conduction of heat directly from the lower portion of the heating element to the adjacent cooking surface, thus preventing the overheating of that portion of the cooking surface nearest the heating element.

The ends of the heating element are brought out through suitable grooves or openings intersecting grooves 18 and 19 adjacent hinge 15 for connection with a source of electrical supply. The terminals of heating element 20 project for some distance forming extensions 30 and 31 to provide for a pivoted terminal connection. These extensions are bent upward slightly over the hinge 15, as shown in Fig. 2, and are provided on their ends with connectors 32 and 33 in electrically conducting relation with the resistance conductor but insulated from the metallic enclosing sheath by mica insulators 34 and 35. The connectors are provided with pairs of parallel projections 36 and 37, extending downward and carrying pins 38 and 39, respectively. Pivotally secured to pins 38 and 39 are conductors 40 and 41 connected to the source of electrical supply. For the purpose of maintaining a good electrical contact between the conductors and the pins U shaped springs 42 and 43 are provided. Spring 42, as shown in Fig. 2, has its ends inserted in the gap between pin 38 and the body of the connector 32, while spring 43 is similarly attached to connector 33. This arrangement assures a good electrical contact between connectors 32 and 33 and the conductors 40 and 41 regardless of the position of plate 11 as it is moved on hinge 15, and eliminates the danger as when a rigid connection is used of the conductors breaking due to movement of the connectors.

For the purpose of protecting the terminals of heating element 20 from grease, etc., plate 25 is provided with an extension 45 extending over and downward on each side of the terminals. To prevent grease running along the extensions 30 and 31 to the terminals, metallic washers 46 and 47 are secured to the extensions adjacent their ends.

As thus constructed and arranged, it will be observed that each heating element is located on the plate so that heat is generated near the point of greatest loss, that is, near the rim or edge of the plate. The walls of each plate, being relatively heavy adjacent the heating elements and tapering toward the edge and the center, are so generated that heat is conducted to the various parts of the plate at rates varying with the rapidity of the heat loss in that particular part so that the heat is finally received uniformly by the various portions of the cooking surface and an even distribution of heat thus obtained. For example, heat is conducted to the extreme edge of the plate at a much faster rate than to the center. In this manner the comparatively large loss of heat at the edge of the plate is compensated for, and the cooking surface at that point maintained at the same temperature as at the center. The rate of heat transmission to the portion of the cooking surface nearest the heating element is further regulated by the small heat insulating air gap provided between the heating element and the bottom of the groove at this point which prevents overheating of the adjacent cooking surface. Due to the tapered shape of the groove, the heating element is forced into intimate thermal relation with the sides of the groove, whereby good heat conductivity is provided for between the heating element and the plate.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. An electric heater comprising a metallic plate provided with a heating surface, and an insulated resistance element mounted near the edge thereof, said plate decreasing in thickness toward its center so that heat is conducted uniformly to the various portions of said heating surface.

2. An electric heater comprising a metallic plate provided with a heating surface and a groove near its edge, and a sheath wire heating element clamped in said groove, said plate decreasing in thickness toward its center so that heat is conducted uniformly to the various portions of said heating surface.

3. An electric heater comprising a metallic plate provided with a heating surface and a tapered groove near its edge, and a sheath wire heating element wedged between the sides of said groove, said plate decreasing in thickness toward its center so that heat is conducted uniformly to the various portions of said heating surface.

4. An electric heater comprising a heated body provided with a tapered groove, and an insulated resistance conductor wedged in said groove in thermal relation with said body.

5. An electric heater comprising a heated body provided with a groove, and a heating element secured in engagement with the sides of said groove but spaced from the bottom thereof.

6. An electric heater comprising a heated body provided with a tapered groove, and a sheath wire heating element wedged between the sides of said groove but spaced from the bottom thereof.

7. An electric heater comprising a metallic plate provided with a heating surface and gradually decreasing in thickness toward its center to form a thickened portion adjacent its edge provided with a tapered groove, and a heating element wedged between the sides of said groove but spaced from the bottom thereof, whereby heat is conducted uniformly to the various portions of said heating surface.

8. An electric heater comprising a heated body provided with a tapered groove, an insulated resistance conductor in said groove, and a clamping member for wedging said resistance conductor in said groove provided with an extension forming a guard for the terminals of said resistance conductor.

9. An electric heater comprising a heated body provided with a tapered groove, a sheath wire heating element in said groove having its terminals brought out adjacent each other, and a clamping member for wedging said heating element in said groove provided with an extension forming a guard for said terminals.

10. An electric heater comprising a pivotally mounted heated body, a heating element therefor, terminals for said heating element, and connecting leads pivotally connected to said terminals so as to maintain the circuit of said heating element when the heated body is swung about its pivot.

11. An electric heater comprising a pivotally mounted heated body, a heating element therefor, terminals for said heating element, connecting pins on said terminals parallel with the pivot of said heated body, conducting leads pivotally connected to said pins in electrically conducting relation therewith, and springs for maintaining said electrically conducting relation when the heated body is swung about its pivot.

12. An electric heater comprising two metallic plates one of which is pivoted, said plates having cooperating cooking surfaces and each decreasing in thickness toward its center to form a thickened portion adjacent its edge provided with a tapered groove, heating elements wedged between the sides of said grooves but spaced from the bottom thereof, clamping members for holding said heating elements in place, pivoted electrical connectors for the terminals of said pivoted plate, and an extension on the clamping member of said pivoted plate forming a guard for said terminals.

In witness whereof, I have hereunto set my hand this 22nd day of February 1922.

JACOB L. SHROYER.